United States Patent
Ohori et al.

[11] Patent Number: 5,929,948
[45] Date of Patent: Jul. 27, 1999

[54] BLACK MATRIX COUPLED TO COMMON ELECTRODE THROUGH A TRANSPARENT CONDUCTIVE FILM

[75] Inventors: Tatsuya Ohori, Tokyo; Michiko Takei, Kanagawa; Hongyong Zhang, Kanagawa; Hideomi Suzawa, Kanagawa; Naoaki Yamaguchi, Kanagawa, all of Japan

[73] Assignee: Semiconductor Energy Laboratory Co., Ltd., Kanagawa-ken, Japan

[21] Appl. No.: 08/808,949

[22] Filed: Feb. 19, 1997

[30] Foreign Application Priority Data

Feb. 20, 1996 [JP] Japan ................................. 8-058330

[51] Int. Cl.[6] .................. G02F 1/136; G02F 1/1333; G02F 1/1343; G02F 1/1345
[52] U.S. Cl. ..................... 349/44; 349/111; 349/143; 349/149; 349/110
[58] Field of Search .................. 349/44, 149, 110, 349/111, 139, 143, 43

[56] References Cited

U.S. PATENT DOCUMENTS

| | | | |
|---|---|---|---|
| 4,759,610 | 7/1988 | Yanagisawa | 349/111 |
| 5,414,547 | 5/1995 | Matsuo et al. | 349/44 |
| 5,585,951 | 12/1996 | Noda et al. | 349/42 |
| 5,708,485 | 1/1998 | Sato et al. | 349/110 |
| 5,782,665 | 7/1998 | Weisfield et al. | 349/111 |

*Primary Examiner*—William L. Sikes
*Assistant Examiner*—Kari M. Horney
*Attorney, Agent, or Firm*—Fish & Richardson P.C.

[57] ABSTRACT

An active matrix liquid crystal display comprising a common electrode (#217), connected to a conductive black matrix (#302 and #303) through a coupling electrode (#227), which allows the black matrix to be set at the common potential. The common electrode is formed on the same layer as that of the source lines and data lines. The pixel electrode (#228) and the coupling electrode (#227) are comprised of the same transparent electrically conductive material.

6 Claims, 7 Drawing Sheets

BLACK MATRIX COUPLED TO COMMON ELECTRODE THROUGH A TRANSPARENT CONDUCTIVE FILM

BACKGROUND OF THE INVENTION

1. Field of the Invention

The present invention relates to a constitution of an active matrix liquid crystal display device. It also relates to a process for fabricating the same.

2. Description of the Related Art

Heretofore, there has been known an active matrix liquid crystal display device. This has a structure in which thin film transistors are disposed on respective pixels being arranged in a matrix, so that electric charges which enter into and outgo from the pixel electrodes can be controlled by thin film transistor.

The constitution above requires a use of a light shielding film that is provided in such a manner to cover the edge portions of the pixel electrodes, and is called as a "black matrix (BM)". In general, a metallic film provided at a thickness of several thousand of angstroms (Å) is used as a BM.

The black matrix does not particularly function electrically, but it is present over the entire pixel matrix region. However, the presence of a thin metallic film being interposed between insulating films and on the entire pixel matrix region induces a problem of accumulating unnecessary charges therein. This problem is not specific after the completion of the device, but is also found in the fabrication process thereof.

As is well known, a film forming step or an etching step using plasma is employed in a general process of fabricating a thin film transistor. If a conductive material exists electrically floating in the fabrication process above, electric charges would be accumulated therein to cause an electrostatic breakdown to an insulating film.

A generally used insulating film is several thousand of angstroms (Å) in film thickness. Further, defects and pinholes are present inside an insulating film (a silicon oxide film or a silicon nitride film) at a non-negligible density.

Accordingly, electrostatic breakdown occurs locally on the insulating film as a result of the phenomenon of charge accumulation in BM above.

This signifies that a failure occurs partially on the device during the fabrication process. That is, the thin film transistors may partially malfunction or the circuits may cause operation failure due to the presence of leak current.

The problem above is particularly serious in the course of fabrication process. Also, after completion of a device, such a problem is a factor of losing reliability of the device.

In the light of the above-mentioned circumstances, an object of the present invention is to overcome the above-mentioned problem of charge up of the black matrix. More specifically, an object of the present invention is to suppress the generation of failure which occurs during the fabrication process due to the charge up of the black matrix, and to thereby improve the reliability of a device after completion.

SUMMARY OF THE INVENTION

Figure 4:
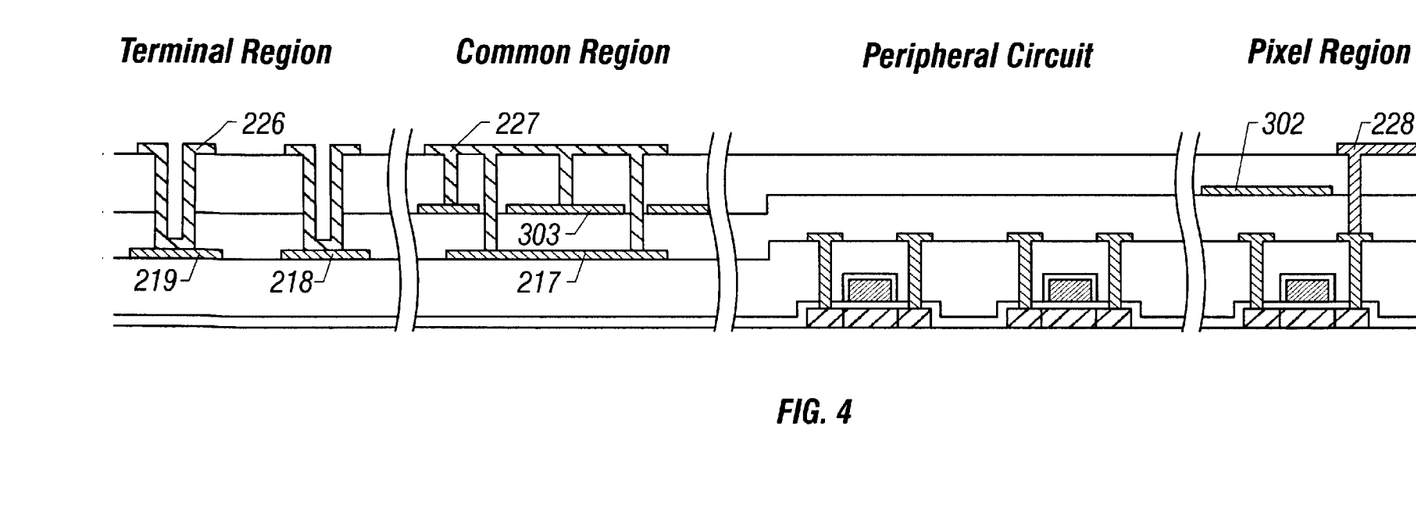
FIG. 4 shows a process step for fabricating an active matrix liquid crystal.

According to one aspect of the present invention, as shown by a specific example thereof in FIG. 4, an active matrix liquid crystal display device is featured by comprising an electrode being formed by using a transparent conductive film 227 constituting a pixel electrode 228, which allows a black matrix 302 to be set as a common potential.

According to another aspect of the present invention, as shown by a specific example shown in FIG. 4, an active matrix liquid crystal display device is featured by comprising an electrode 217 being formed on the same layer as that of a source line 215 (refer to FIGS. 2(A) to 2(E)), which allows the black matrix 302 to be set as the common potential.

DETAILED DESCRIPTION OF THE PREFERRED EMBODIMENTS

The constitution of the present invention is described in further detail with reference to the examples mentioned below. It should be understood, however, that the present invention is not to be construed as being limited thereto.

EXAMPLE 1

Figure 1:
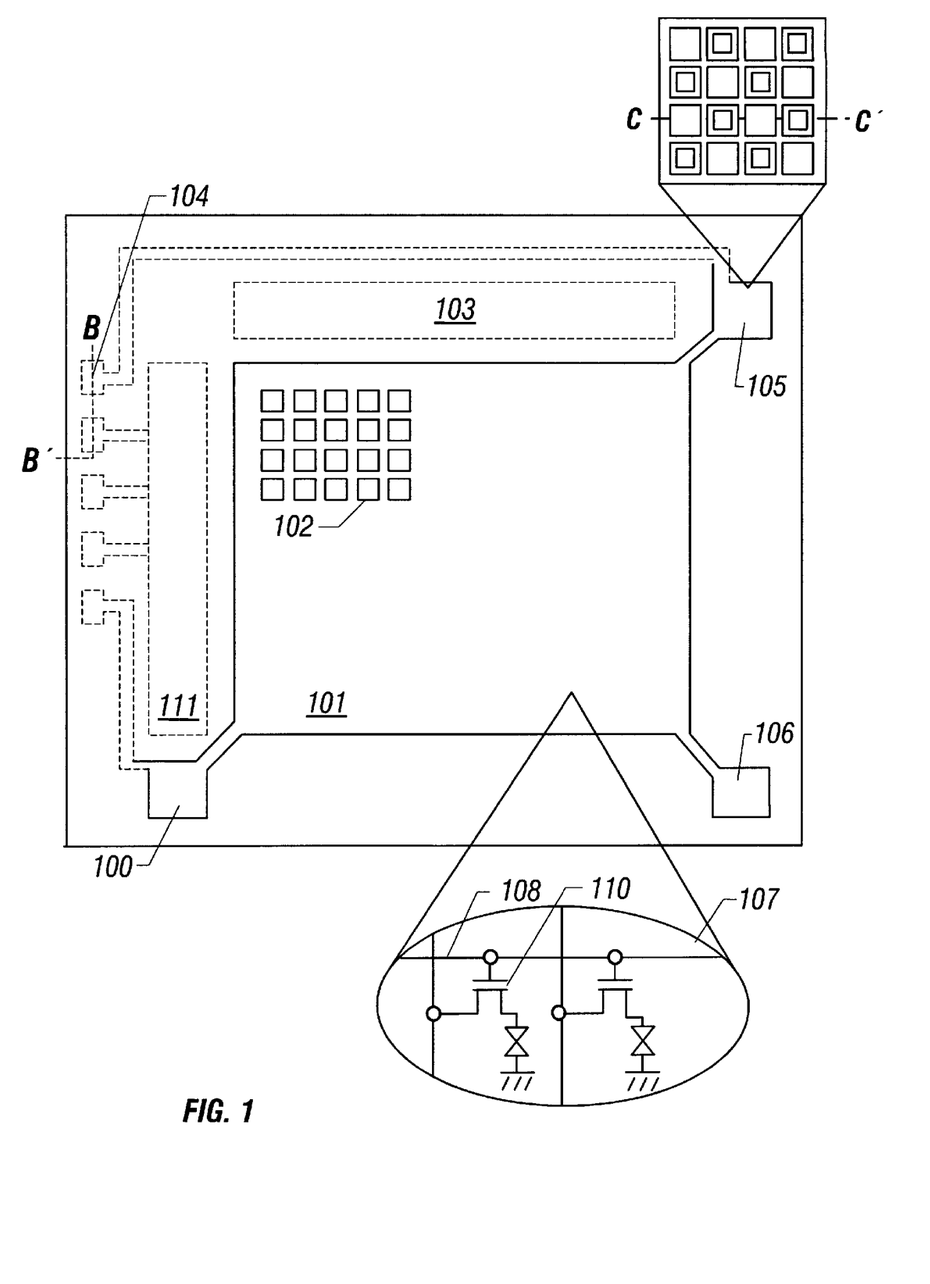
FIG. 1 shows an outline of an active matrix liquid crystal display device.

FIG. 1 schematically shows a top view of an active matrix liquid crystal display device according to the present invention. Referring to FIG. 1, the device comprises an active matrix region 101 consisting of pixel electrodes arranged in a matrix of several hundred by several hundred of pixel electrodes, and peripheral driver circuits 103 and 111 provided for driving the thin film transistors arranged in the active matrix region 101.

Pixel electrodes arranged in a matrix are provided in the active matrix region 101, and a thin film transistor is provided to the respective pixel electrodes.

An enlarged outline of the constitution of an active matrix is shown by an enlarged view 107. As shown in the enlarged view 107, source lines (data lines) denoted by 109 and gate lines denoted by 108 are arranged in a lattice. A thin film transistor 110 is located at a region surrounded by the source lines and the gate lines, and the source thereof is connected to the source lines. The drain of the thin film transistor is connected to a pixel electrode not shown in the figure. The pixel electrode is provided in a region surrounded by the gate lines and the source lines.

Referring to FIG. 1, reference numeral 102 denotes an opening portion of the black matrix. The region except for the opening portion is shielded from light. A pixel electrode is provided in the opening portion 102.

To maintain the potential of the black matrix itself at a predetermined value, black matrix is extended up to the common electrodes 105, 106, and 100. The common electrodes are connected via an electrically conductive pad to the facing common electrodes provided to the facing substrate when adhering to the opposing substrate.

Furthermore, a wiring is extended from the common electrode to a terminal portion as shown by reference numeral 104.

By employing the constitution above, the black matrix is maintained at a predetermined potential. Thus, the device can be protected against partial destruction due to the effect of, for instance, static electricity.

The fabrication process for an active matrix liquid crystal display device having a constitution as is shown in FIG. 1 is described below. The process includes the formation of the active matrix region 101 in which a pixel electrode is provided with a thin film transistor; the formation of a p-type thin film transistor and an n-type thin film transistor provided in a peripheral driver circuit region 103 or 111; the formation of common electrode portions 105 to 107, particularly, the fabrication step shown by the cross section along line C-C'; and the formation of a terminal portion 104, particularly, the fabrication step shown by the cross section along line B-B'.

FIGS. 2(A) to 2(E) show the fabrication steps for each of the portions. A 3,000-Å-thick underlying film (not shown) is formed of a silicon oxide film or a silicon oxynitride film on a glass substrate 201. The underlying film functions to prevent the impurities from diffusing from the glass substrate.

Figure 2A:
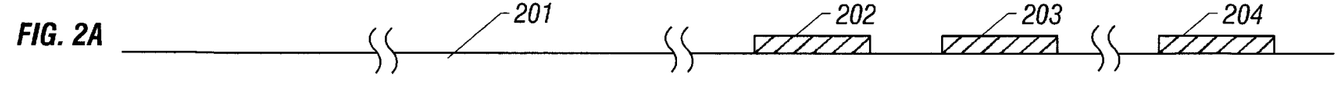
FIGS. 2(A) to 2(E) show the process steps for fabricating an active matrix liquid crystal.

A 500-Å-thick amorphous silicon film (not shown) is formed thereafter by a plasma CVD, and a heat treatment is performed or a laser light is irradiated to obtain a crystalline silicon film by crystallization.

By patterning the thus obtained crystalline silicon film, island-like regions 202, 203, and 204 are formed to provide an active layer of the thin film transistor. Thus is obtained a state as shown in FIG. 2(A). Because the thin film transistors are formed on peripheral circuits and a pixel region, nothing is formed on the terminal portion and the common region at this state.

Then, a 1,000-Å-thick silicon oxide film 205 which functions as a gate insulating film is formed by a plasma CVD.

A 4,000-Å-thick aluminum film (not shown) constituting the gate electrode is formed by sputtering. Scandium is added into the aluminum film at a concentration of 0.2% by weight to prevent hillocks from generating. Hillocks are irregularities or protrusions occurring on the surface of the films and patterns due to the abnormal growth of aluminum during a heating step.

Then, the aluminum film above is patterned to form gate electrodes 206, 208, and 210. Gate wirings extended from the gate electrodes are formed simultaneously with the formation of gate electrodes. For convenience, the gate electrodes and gate wiring thus obtained are referred to as "the wirings of first layer".

Dense anodic oxide films 207, 209, and 211 are formed thereafter to a film thickness of 1,000 Å by performing anodic oxidation in an electrolytic solution using the gate electrode as an anode.

The anodic oxide film functions to prevent the generation of hillocks on the surface of the gate electrodes and the gate wirings extending therefrom. An offset gate region can be formed in the later step of implanting impurity ions by increasing the film thickness of the anodic oxide film.

Figure 2B:
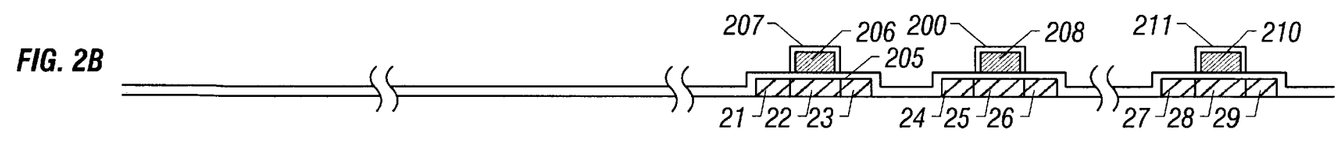

Then, by implanting impurity ions, source/drain regions as well as channel forming region are formed in each of the active layers. In the present example, P (phosphorus) ions are implanted into active layers 202 and 204. Further, B (boron) ions are implanted into the active layer 203. The selective implantation of impurity ions is performed by using a resist mask. Thus, source regions 21, 26, and 27, as well as drain regions 23, 24, and 29 are formed in a self-aligning manner in this step. Furthermore, channel forming regions 22, 25, and 28 are formed in a self-aligning manner.

Laser light is irradiated after implanting impurity ions to activate the ion-implanted regions. This step may be performed by irradiating an infrared ray or an ultraviolet ray.

Thus is obtained a state as is shown in FIG. 2(B). Next, a first interlayer insulating film 212 is formed to a thickness of 1,000 Å. A silicon nitride film is used for the interlayer insulating film 212, and is formed by a plasma CVD (FIG. 2(C)).

Figure 2C:
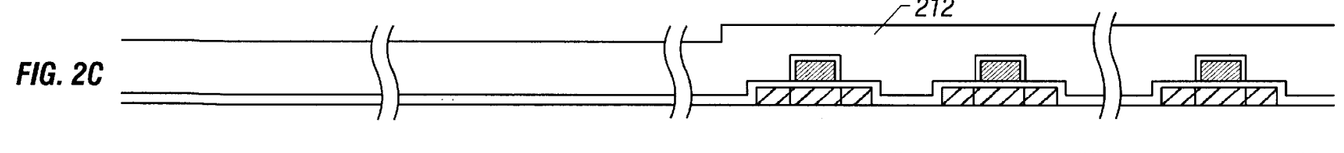

Incidentally, a silicon oxide film or a silicon oxynitride film may be used for the first interlayer insulating film 212.

Figure 2D:
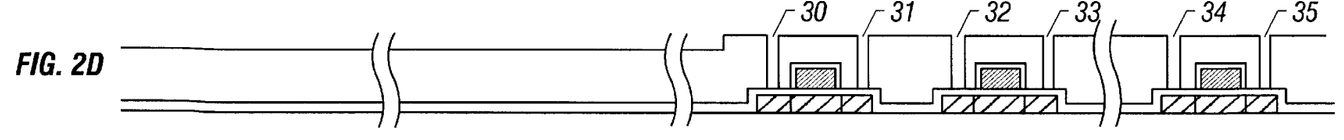

Contact holes 30 to 35 are formed thereafter (FIG. 2(D)).

Figure 2E:
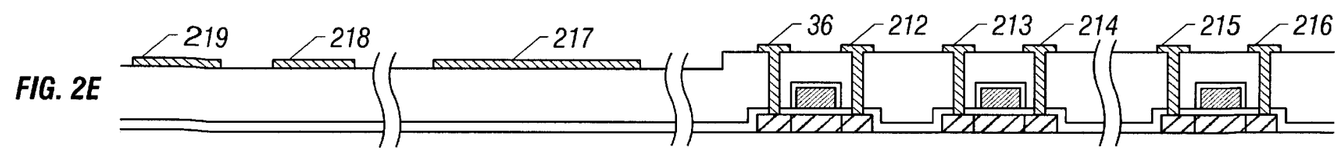

After obtaining the state as shown in FIG. 2(D), electrodes in contact with each of the active layers are formed as shown in FIG. 2(E).

In this step, source electrodes 36 and 214 as well as drain electrodes 212 and 213 are formed for the thin film transistor provided to the peripheral circuits, while a source electrode 215 and a drain electrode 216 are formed for the thin film transistor provided to the pixel region.

At the same time, necessary wirings are formed extended from each of the electrodes. For instance, simultaneously with the formation of the source electrode 215 for the thin film transistor of the pixel region, a source wiring extended therefrom is formed. In the peripheral circuits, necessary wiring pattern is formed. A CMOS structure is obtained by connecting the drain electrodes 212 and 213 in the peripheral circuits.

An electrode is formed simultaneously also in the terminal portion and the common region. In this case, patterns 219 and 218 constituting the electrodes of the terminal portion, and a pattern 217 constituting the common electrode for the common region are formed.

The common electrode is extended to the terminal portion, and is connected to the proper potential (FIG. 2(E)).

The electrodes and patterns shown in FIG. 2(E) are formed in a three-layered structure comprising a 500 to 1,000-Å-thick titanium film, a 2,000-Å-thick aluminum film, and a 1,000-Å-thick titanium film.

For convenience, the electrodes and patterns formed in this step is referred to as "the wirings of second layer".

A titanium film is provided as the lowermost layer, because aluminum cannot establish a favorable electric contact with the semiconductor constituting the active layer. This resides in the fact that a favorable ohmic contact is unfeasible between aluminum and a semiconductor.

An aluminum film is provided as the intermediate layer to take an advantage of the low electric resistance thereof as much as possible.

A titanium film is provided for the uppermost layer to establish a good contact between a pixel electrode (an ITO electrode) to be formed hereinafter and the drain electrode 216 of the thin film transistor provided in the pixel region.

That is, although a favorable ohmic contact is unavailable by directly bringing aluminum into contact with an ITO electrode, a favorable ohmic contact can be obtained by combining a titanium film with an ITO electrode, or by combining a titanium film with an aluminum film.

Similarly in the common region in the later steps, it is necessary to connect BM with the common electrode 217 in the second layer via an ITO electrode. To form a favorable electric contact with an ITO electrode, in this case, it is necessary to provide a titanium film for the uppermost layer of the wirings of the second layer.

Further, in the later steps, the terminal electrodes 218 and 219 constructed by the wirings of the second layer in the terminal region must be in contact with an ITO electrode. Thus, to establish a favorable electric contact between the terminal electrode and the ITO electrode, a titanium film is provided as the uppermost layer of the wirings of the second layer.

Thus is obtained a state shown in FIG. 2(E). Then, as shown in FIG. 3(A), a silicon oxide film is formed at a thickness of 2,000 Å to provide a second interlayer insulating film 301.

Figure 3A:
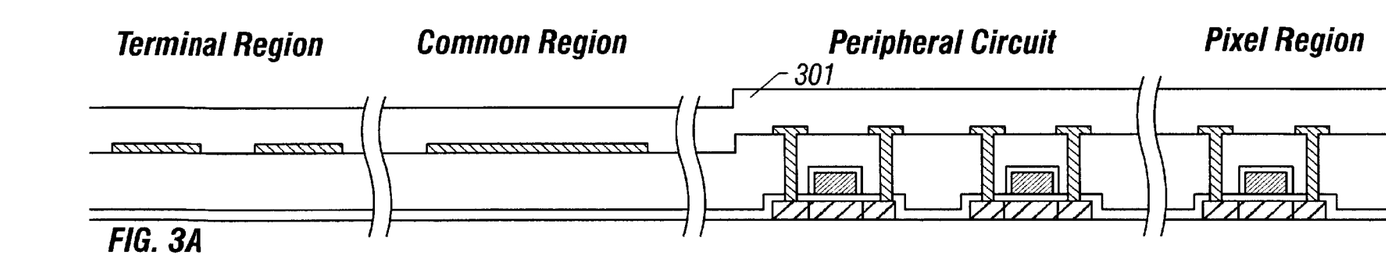
FIGS. 3(A) to 3(C) show the process steps for fabricating an active matrix liquid crystal.

Once a state as shown in FIG. 3(A) is obtained, a titanium film is formed at a thickness of 3,000 Å to constitute BM (black matrix) layers 302 and 303. As a material of the BM, a chromium film or a layered film of titanium film and chromium film, or a proper metallic film other than those enumerated herein can be used.

Figure 3B:
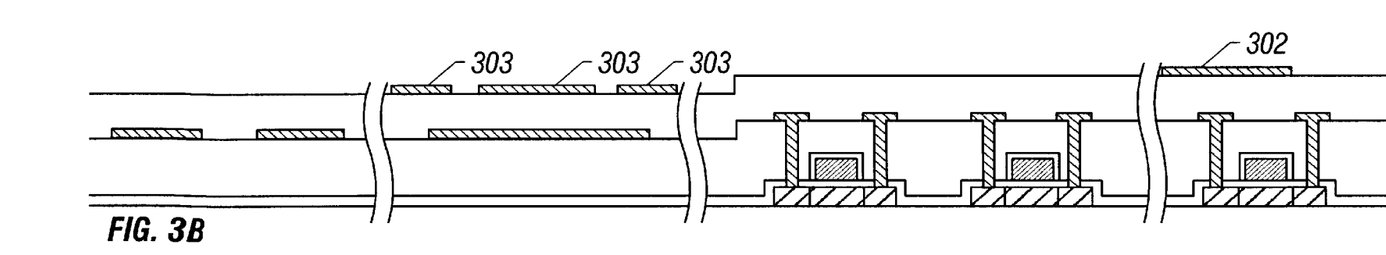

Referring to FIG. 3(B), the region 302 functions as a BM. The region 303 is the region extended from the BM 302 to the common region.

Figure 3C:
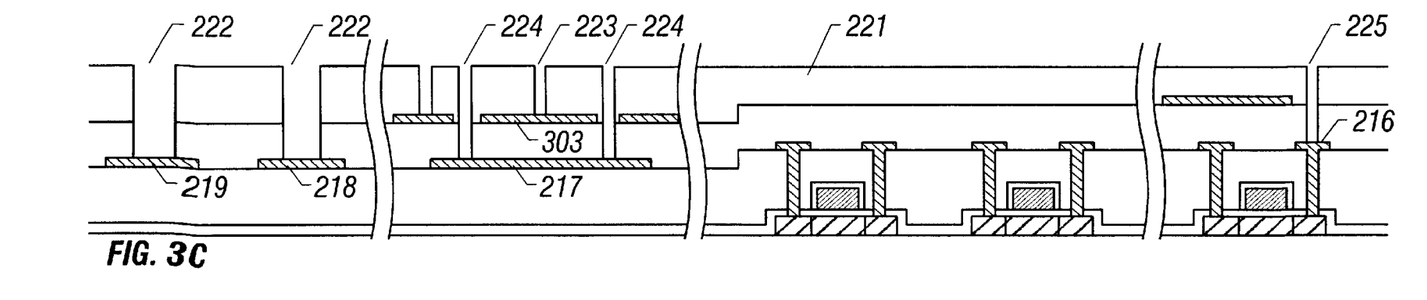

Referring to FIG. 3(C), a third interlayer insulating film 221 is formed thereafter. Specifically in this case, a 2,000-Å-thick silicon oxide film is formed by a plasma CVD.

Then, as shown in FIG. 3(C), openings 222, 223, 224, and 225 are formed. The opening 222 is provided to form an electrode for the terminal portion. The openings 223 and 224 are provided to electrically connect the wirings of the second layer with the BM layers 302 and 303.

Also, the opening 225 is provided, so that an ITO electrode, which is provided later as a pixel electrode, may be contacted with the drain electrode 216 of the thin film transistor provided in the pixel region.

Then, as shown in FIG. 4, ITO electrodes 226, 227, and 228 are formed simultaneously. In this instance, the portion 228 functions as a pixel electrode 228. Further, the portion 227 becomes the electrode pattern which connects the wiring 217 of the second layer with the electrode pattern 220 extended from BM, while the portion 226 becomes an electrode of the terminal portion.

It should be noted that an electrode to be brought into contact with the opposing substrate is formed on the electrode pattern 227 of the common region by using a silver paste.

By employing the constitution thus obtained, the BM layers 302 and 303 can be prevented from becoming electrically different from the other regions.

Referring to FIG. 4, for instance, a final protective film (not shown) is formed, and after forming a rubbing film (also not shown) thereon to use in the rubbing of liquid crystal, the rubbing step is performed. In such a case, the generation of static electricity frequently causes the destruction of the thin film transistor or the static breakdown of the insulating film.

However, in the constitution according to the present example, the black matrix can be maintained at a predetermined potential and the accumulation of electric charges thereon can be prevented from occurring. Accordingly, the generation of above-mentioned defects can be avoided.

EXAMPLE 2

The present example refers to a constitution similar to that of Example 1, except that a part of the process steps is changed. The process steps of the constitution of the present invention are the same with the steps of Example 1 up to the step illustrated in FIG. 3(A).

Figure 5A:
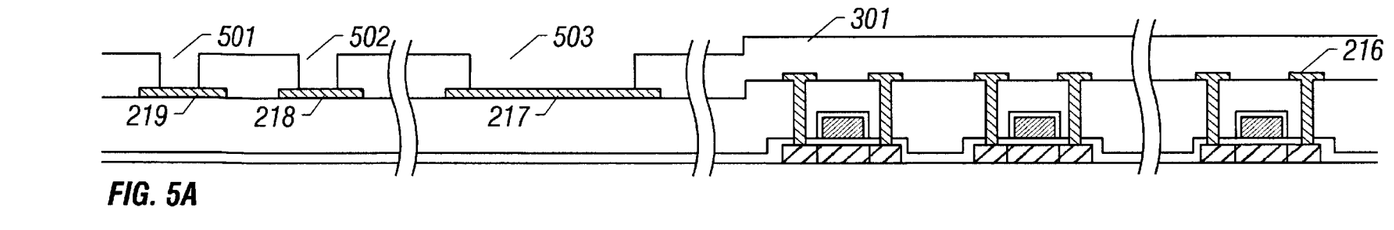
FIGS. 5(A) to 5(C) show the process steps for fabricating still another active matrix liquid crystal.

Thus, the state as shown in FIG. 3(A) is obtained in accordance with the process steps shown in Example 1. Once the state as shown in FIG. 3(A) is obtained, opening portions 501, 502, and 503 are formed as shown in FIG. 5(A). That is, openings 501 to 503 are formed in the second interlayer insulating film 301.

Figure 5B:
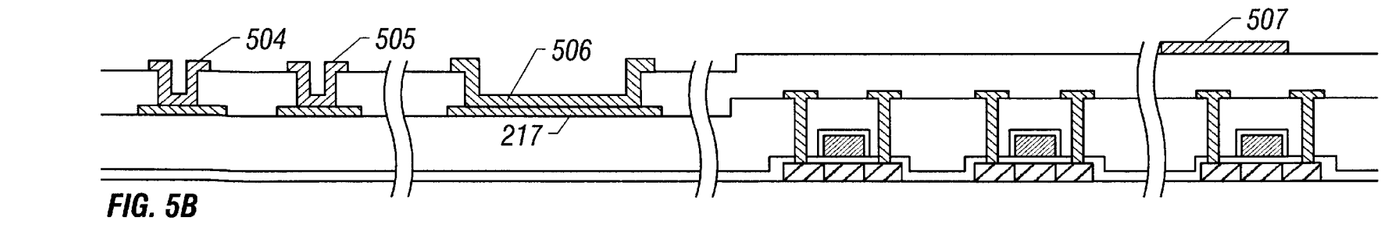

Then, titanium films 504 to 507 constituting BM are formed and patterned to obtain a state as shown in FIG. 5(B). In this case, the pattern 507 functions as an initial BM.

Also, the pattern 506 brings the electrode 217 for common in the second layer surface into contact with the pattern extended from BM.

Further, electrodes 504 and 505 contact with the electrodes 218 and 219 of the first layer constituting the terminal portion.

The constitution of the present example differs from that of Example 1 in that the electrodes 504 and 505 in the terminal portion are formed by the material constituting BM. Further, it differs from that of Example 1 in that the electrode 506 extended from BM is brought into direct contact with the common electrode 217 of the second layer.

Once a state as shown in FIG. 5(B) is obtained, an interlayer insulating film 508 in the third layer is formed. In this case, similar to Example 1, a silicon oxide film is used to form the interlayer insulating film 508 for the third layer (FIG. 5(C)).

Figure 5C:
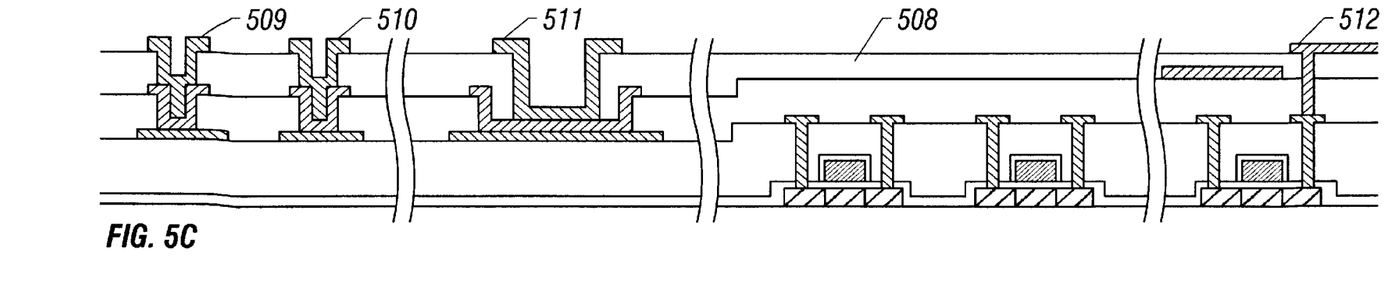

Contact holes are formed thereafter. Then, an ITO film is formed to a thickness of 1,500 Å by sputtering. By patterning the thus formed ITO film, a pixel electrode 512 is formed.

An electrode 511 for the common region is formed at the same time. This electrode 511 functions as an electrode to be contacted later with the common electrode provided in the opposed substrate. Electrodes 504 and 505 later provide electrode terminals in the terminal portion.

In the constitution of the present example, the electrode 506 extended from the BM 507 can be directly contacted with the electrode 217 for the common provided in the second layer. Thus, a more sure contact can be formed.

The connection of the BM and the electrode for use as the common is established in order to maintain a common potential. Accordingly, the contact resistance must be lowered as much as possible. The constitution of the present example is effective in accomplishing such an object.

EXAMPLE 3

The present Example refers to a constitution similar to that of Example 1, except that a double layered film of titanium film/aluminum film is used for the wirings in the second layer, instead of the three layered film of titanium film/aluminum film/titanium film used in the constitution of Example 1.

As described above in Example 1, the three layered structure is employed for the wirings in the second layer to lower the resistance of the contact with the active layer as well as that with the ITO, or of the wiring itself.

However, the multilayered structure above requires more steps in forming the film. Accordingly, from the viewpoint of reducing fabrication cost, it is preferred to employ a film available with less number of layers. From this point of view, the constitution of the present example utilizes a double layered titanium film/aluminum film for the wirings of the second layer.

Thus, the constitution of the present example comprises process steps partially differed from those employed in the constitution of Example 1. With a partial exception, the fabrication process steps up to the state shown in FIG. 3(A) for the constitution of the present example are the same as those described in Example 1.

The state as shown in FIG. 3(A) is obtained in accordance with the process steps shown in Example 1, except for not forming the opening 35 in the process step illustrated in FIG. 2(D).

Further, in the step shown in FIG. 2(E), the wirings 217 to 219 as well as 36, and the wirings 212 to 215 all provided for the second layer are formed by using a double layered film of a 1,000-Å-thick titanium film and a 3,000-Å-thick aluminum film. As a matter of fact, the electrode 216 is not formed.

Figure 6A:
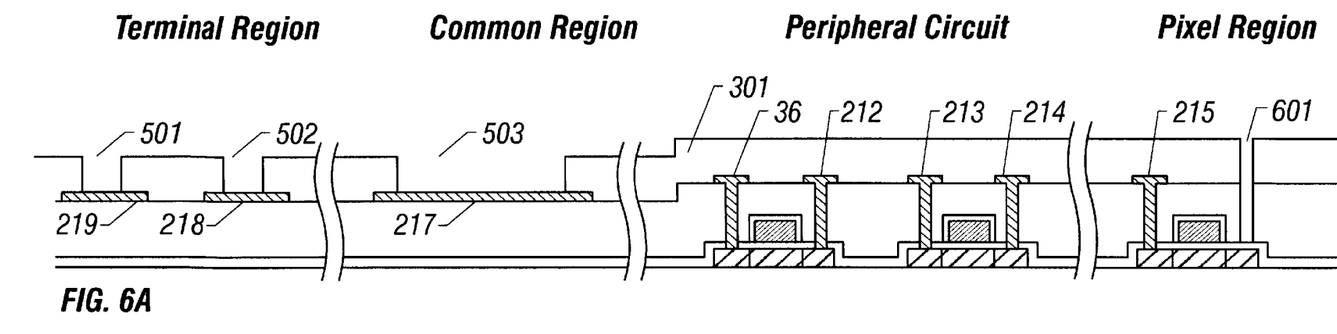
FIGS. 6(A) to 6(C) show the process steps for fabricating yet another active matrix liquid crystal.

Once the state as shown in FIG. 3(A) is obtained, opening portions 501, 502, 503, and 601 are formed as shown in FIG. 6(A). That is, openings 501 to 503, and 601 are formed in the second interlayer insulating film 301.

FIG. 6(A) corresponds to the foregoing FIG. 5(A). The structure shown in FIG. 6(A) differs from that in FIG. 5(A) that the former comprises an opening 601, whereas the latter comprises an electrode 216 being formed in the corresponding portion.

Figure 6B:
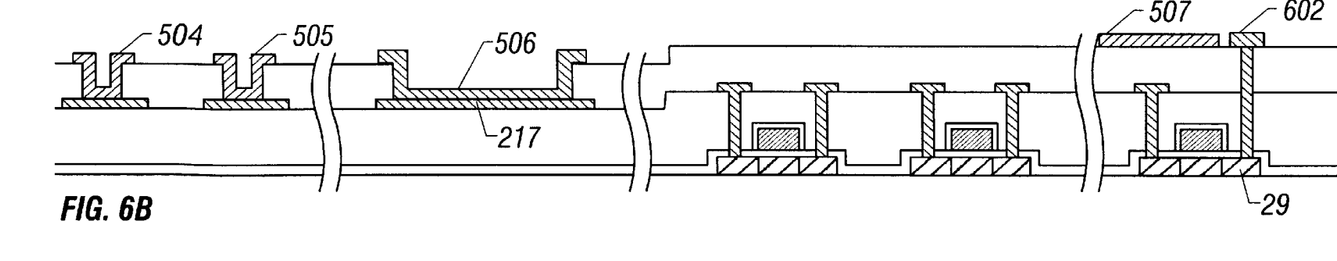

Then, titanium films constituting BM layers 504 to 507 are formed and patterned to obtain a state as shown in FIG. 6(B). In this case, the pattern 507 functions as an initial BM.

Also, the pattern 506 functions as an electrode for bringing the electrode 217 for common in the second layer into contact with the pattern extended from BM.

Further, electrodes 504 and 505 contact with the electrodes 218 and 219 of the first layer constituting the terminal portion.

In this step, the electrode 602 which contacts with the opening portion 601 by the drain region 29 is formed by using the same material as that used for forming the BM 507.

The constitution of the present example differs from that of Example 1 in that the electrodes 504 and 505 in the terminal portion are formed by the material constituting BM. Further, it differs from that of Example 1 in that the BM 507 is brought into direct contact with the common electrode 217 of the second layer by the electrode 506. Furthermore, it also differs from Examples 1 and 2 in that the electrode 602 in contact with the drain region of the thin film transistor of the pixel portion is formed by using the matrix used for the BM.

By obtaining a state as shown in FIG. 6(B), it is made clear that the wirings 217 to 218, 36, and 212 to 215, in the second layer are obtained successfully by using a double layered film using titanium and aluminum.

More specifically, it can be seen that not titanium, but BM material is brought into contact with the top surface of the wirings of the second layer. Thus, an ohmic contact can be established without any problem by using a wiring comprising aluminum on the top surface of the wirings of the second layer.

Thus, in the present example, a double layered structure comprising a titanium lower layer and an aluminum upper layer can be used for the wirings of the second layer.

Once a state as shown in FIG. 6(B) is obtained, an interlayer insulating film 508 for the third layer is formed. In this case, similar to Example 1, a silicon oxide film is used to form the interlayer insulating film 508 for the third layer (FIG. 6(C)).

Figure 6C:
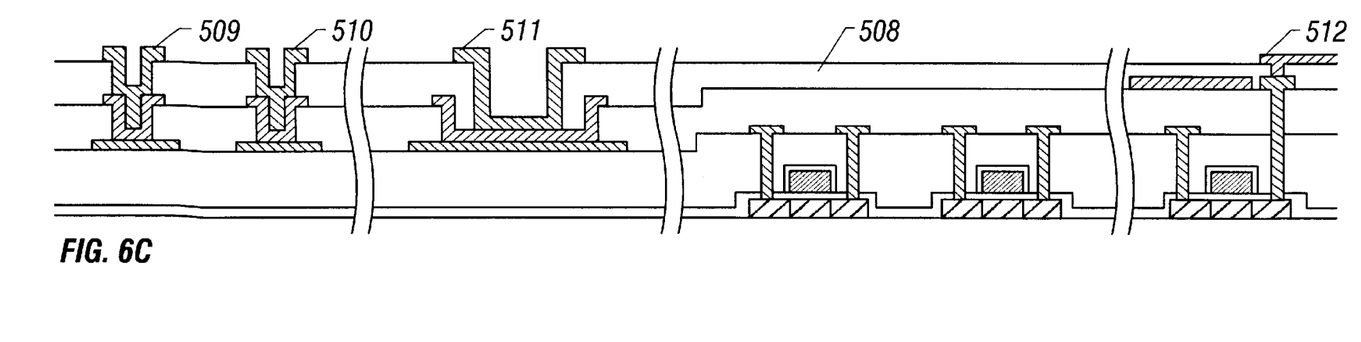

Contact holes are formed thereafter. Then, an ITO film is formed to a thickness of 1,500 Å by sputtering. By patterning the thus formed ITO film, a pixel electrode 512 is formed.

An electrode 511 for the common region is formed at the same time. This electrode 511 functions as an electrode to be contacted later with the common electrode provided in the opposed substrate. Electrodes 509 and 510 later provide electrode terminals in the terminal portion.

In case the constitution of the present example is used, the electrode 506 extended from the BM 507 can be directly contacted with the electrode 217 for the common provided in the second layer. Thus, a more sure contact can be formed.

The connection of the BM and the electrode for use as the common is established in order to maintain a common potential. Accordingly, the contact resistance must be lowered as much as possible. The constitution of the present example is effective in accomplishing such an object.

Furthermore, the wirings in the second layer may be formed by using a double layered structure consisting of a titanium film and an aluminum film. This is useful in reducing process steps in the fabrication of the device.

EXAMPLE 4

The present example refers to a constitution in forming the film constituting BM, which is employable in the processes described in Examples 1 to 3 above, so that the insulating film may not undergo electrostatic breakdown due to a high potential generated by BM during the film forming process.

As described in Examples 1 to 3 above, BM is finally formed so that it may yield a predetermined potential. However, in the film forming process of BM (sputtering is used in general), BM sometimes becomes charged up in such a manner that BM acquires a high potential as compared with the other regions.

Figures 7A, 7B:
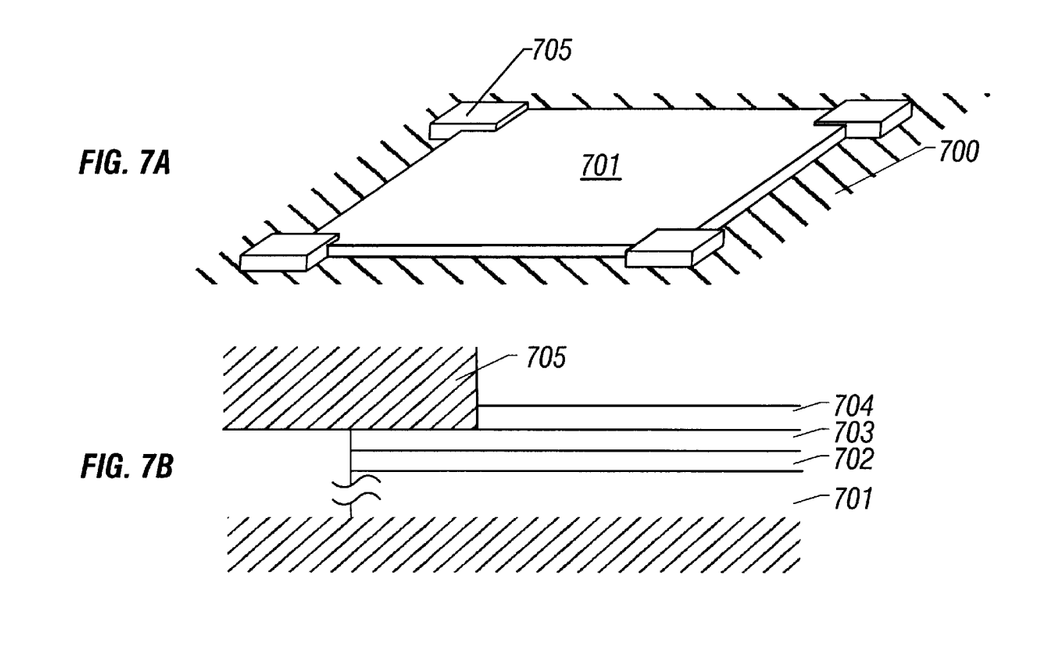
FIGS. 7(A) to 7(C) the state of a BM material formed into a film.
Figure 7C:
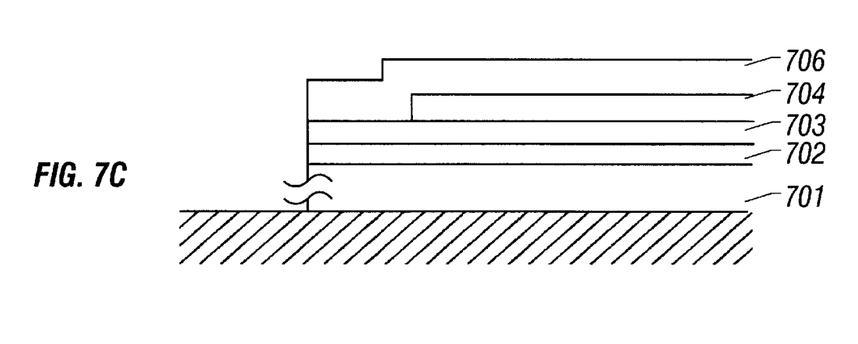

The present example is provided to overcome the problem above. FIGS. 7(A) to 7(C) show the schematically drawn constitution according to the present invention. Referring to FIG. 7(B), a first interlayer insulating film 702 and a wiring 703 for the second layer are formed on a substrate 701 at first. In this case, a part of the wiring in the second layer is extended to the corner portion of the substrate 701.

Then, in forming the interlayer insulating film for the second layer by a plasma CVD, the portion, in which the extended portion 702 of the wirings of the second layer is present, is supported with a claw 705 for fixing the substrate 701, in such a manner that the portion is placed on the electrode 700.

Once this state is attained, the interlayer insulating film 704 for the second layer is formed. Thus is obtained a state in which no film is formed on the portion where the claw 705 was present.

Then, the BM material is formed by sputtering and the like. Thus, a contact is established between the extended wiring 703 of the second layer and the BM film 706. In this manner, BM material can be prevented from acquiring a special potential during the film formation process or before forming the common electrode.

It should be noted that the insulating film 702 is an insulating film constituting a substrate on which the wirings of the second layer are formed.

As is described in the foregoing, the problem of charge up of black matrix can be overcome by using the constitution according to the present invention. In other words, failures caused during the fabricating process due to the charge up of black matrix can be prevented from occurring. Furthermore, finished devices with improved reliability can be obtained.

While the invention has been described in detail and with reference to specific embodiments thereof, it will be apparent to one skilled in the art that various changes and modifications can be made therein without departing from the spirit and scope thereof.

What is claimed is:

1. An active matrix liquid crystal display device comprising at least a pixel electrode and a black matrix, and a transparent conductive film electrode connected to said black matrix to apply a common potential thereto from external source, wherein said electrode comprises a transparent conductive layer which is the same layer as the pixel electrode.

2. An active matrix liquid crystal display device comprising at least a black matrix, a source line and a common electrode connected to said black matrix to give a common potential thereto, wherein said common electrode connected to said black matrix is formed from a same layer as said source line.

3. An active matrix device comprising:

a substrate;

a plurality of gate lines formed over said substrate;

a plurality of data lines formed over said substrate in an orthogonal relation with said plurality of gate lines to define a plurality of pixels at intersections thereof;

a plurality of pixel electrodes comprising a transparent conductive matrix provided at said plurality of pixels;

a plurality of thin film transistors connected to said pixel electrodes, respectively, each of said thin film transistors having at least a gate electrode, source, drain and channel regions where the gate electrode is connected to one of the gate lines, and the source region is connected to one of the data lines; and a black matrix comprising a metallic material and formed over said substrate to define a periphery of said pixel electrodes, wherein said black matrix is given an electrically fixed potential by a common electrode which is formed from a same layer as the data lines.

4. An active matrix device according to claim 3 wherein said black matrix is given said electrically fixed potential by a coupling electrode comprising the same material as said transparent conductive material.

5. An active matrix device according to claim 3 wherein the drain region of the transistors is electrically connected to the associated pixel electrodes via a conductive material which is the same material as a material of said black matrix.

6. An active matrix device comprising:

a substrate;

a plurality of gate lines formed over said substrate;

a plurality of data lines formed over said substrate in an orthogonal relation with said plurality of gate lines to define a plurality of pixels at intersections thereof;

a plurality of pixel electrodes comprising a transparent conductive matrix provided at said plurality of pixels;

a plurality of thin film transistors connected to said pixel electrodes, respectively, each of said thin film transistors having at least a gate electrode, source, drain and channel regions where the gate electrode is connected to one of the gate lines, and the source region is connected to one of the data lines;

a black matrix comprising a metallic material is formed over said substrate to define a periphery of said pixel electrodes; and an electrode comprising the same material as said transparent conductive material coupled to said black matrix, and providing an electrically fixed potential to said black matrix.

* * * * *